United States Patent [19]

van der Tol

[11] Patent Number: 5,185,828
[45] Date of Patent: Feb. 9, 1993

[54] OPTICAL WAVEGUIDE (TE,TM) MODE CONVERTER

[75] Inventor: Johannes J. G. M. van der Tol, Zoetermeer, Netherlands

[73] Assignee: Koninklijke PTT Nederland N.V., Groningen, Netherlands

[21] Appl. No.: 880,705

[22] Filed: May 8, 1992

[30] Foreign Application Priority Data

May 16, 1991 [NL] Netherlands ............ 9100852

[51] Int. Cl.$^5$ .............................................. G02B 6/10
[52] U.S. Cl. ........................................ 385/28; 385/11; 385/31; 385/131; 385/132; 359/195
[58] Field of Search ............ 385/1, 2, 3, 10, 11, 385/14, 27, 28, 31, 37, 45, 129, 130, 131, 132; 359/192, 195

[56] References Cited

U.S. PATENT DOCUMENTS

| | | | |
|---|---|---|---|
| 3,614,198 | 10/1971 | Martin et al. | 385/129 |
| 3,884,549 | 5/1975 | Wang et al. | 385/129 |
| 4,359,260 | 11/1982 | Reinhart et al. | 385/28 X |
| 4,773,721 | 9/1988 | Erman et al. | 385/131 X |
| 4,775,206 | 10/1988 | Erman et al. | 385/131 X |
| 4,859,013 | 8/1989 | Schmitt et al. | 385/130 |
| 4,867,510 | 9/1989 | Dobson | 385/130 |
| 4,974,931 | 12/1990 | Poole | 385/28 |
| 4,983,005 | 1/1991 | Gamonal | 385/14 |
| 5,078,512 | 1/1992 | Ando | 385/131 |
| 5,078,516 | 1/1992 | Kapon et al. | 385/129 |

FOREIGN PATENT DOCUMENTS

| | | | |
|---|---|---|---|
| 0277427A1 | 8/1988 | European Pat. Off. | 385/28 X |
| 0310174A1 | 4/1989 | European Pat. Off. | 385/28 X |
| 2090992A | 7/1982 | United Kingdom | 385/28 X |

OTHER PUBLICATIONS

H. P. Nolting et al, "TE-TM Polarization Transformer With Reset-free Optical Operation for Monolithic Integrated Optics", Proc. ECIO '87 Glasgow, pp. 115-118.
H. G. Unger "Planar optical waveguides and fibres", Clarendon Press, Oxford 1980, cpt 8 Fibre junctions and transitions, Section 8.1 'Analysis of fibre mode excitation', pp. 700-709.
T. Okoshi et al, "Polarization-diversity receiver for heterodyne/coherent optical fiber communication", IOOC 1983, Jun. 1983, Paper 30C-2, pp. 386-387.
C. Duchet et al "New TE/TM polarization splitter made in Ti:LiNBO$_3$ using x-cut and z-axis propagation", Electronics Letters, Jul. 5, 1990, vol. 26, No. 14, pp. 995-997.
W. K. Burns et al, "Mode conversion in planar-dielectric separating waveguides", IEEE J. Quant, Electr. vol. QE-11, No. 1, Jan. 1975, pp. 32-39.
Y. Shani et al, "Polarization rotation in asymmetric periodic loaded rib waveguides", Integrated Photonics Research, Apr. 9-11, 1991, paper ThH3, Proc. IPR 1991, pp. 122-123.
R. C. Youngquist et al, "All-fibre components using periodic coupling", IEEE Proceedings, vol. 132, Pt. J., No. 5, Oct. 1985, pp. 277-286.

Primary Examiner—Brian Healy
Attorney, Agent, or Firm—Frishauf, Holtz, Goodman & Woodward

[57] ABSTRACT

Mode converter for converting a fraction of one guided mode of an optical signal in an incoming optical waveguide section (A) into another guided mode in an outgoing wave-guiding section (C) by means of a periodic coupling between both guided modes in an intermediate optical waveguide section (B). The intermediate section (B) has a periodic geometrical structure as a result of an N-fold periodic sequence of two light-guiding subsections (P, Q) within a period length ($L_P + L_Q$). The sequence can be obtained by arranging for the waveguide profiles of the subsections to differ from one another, preferably as a result of differences in width. The sequence can also be obtained by offset joining of the two subsections with the same waveguide profiles. Advantages are: the high degree of integrability, the ability to co-integrate a laser light source in an optical section of a coherent optical receiver and the achievement of a new integrated design of such an optical section, which design is free of metallized elements.

27 Claims, 3 Drawing Sheets

OPTICAL WAVEGUIDE (TE,TM) MODE CONVERTER

BACKGROUND OF THE INVENTION

1. Field of the Invention

The invention is in the field of the conversion of guided modes of light waves in integrated optical components. More particularly, the invention relates to a mode converter based on the principle of periodic coupling between guided modes of a light wave propagating in a channel-type optical waveguide. In addition, the invention relates to an optical input section for a coherent optical receiver in which such a mode converter is used.

2. Prior Art

In a coherent optical receiver such as can be used in a coherent optical network, a laser is usually incorporated as local oscillator. The light from said laser is mixed with an optical signal received from such a network by the receiver. Since the light transmission through the network is generally not polarization-preserving, the polarization of the optical signal received is undefined. The optical signal received is therefore first split into two polarization components TE and TM, which are then processed separately. This is done by mixing with the light of the local oscillator either directly before or directly after splitting. This technique is known by the term 'polarization diversity.' This means, however, that the light of the local oscillator must also contain both polarization components in order to have mixing components which correspond in polarization with the two polarization components of the optical signal received. A laser which is standard in this connection and has a wavelength of the emitted light in the near infrared transmits, however, only TE-polarized light. To obtain the other polarization component consideration could be given to tilting the laser through a suitable angle. However, in an integrated design of the coherent optical receiver, in which the laser is co-integrated, tilting the laser is troublesome, if not impracticable. It is therefore first necessary to convert a portion of said TE-polarized light into TM-polarized light with the aid of a polarization converter or rotator. A polarization converter is understood as meaning a device with which a known portion of one polarization component, TE or TM, in the optical signal at the input of said device is converted into the other polarization component TM or TE respectively, at the output, with a well-defined phase with respect to the one polarization component. A polarization rotator is such a type of device in which, however, a phase shift is uncontrolled. Such TE/TM polarization converters and rotators are known per se, for example from references [1], [2] and [3] (see under D.). Reference [1] discloses a polarization converter for optical waves which is able to convert any input polarization into any desired output polarization. This known converter comprises a polarization rotator sandwiched between two phase shifters. Both the phase shifters and the polarization rotator are based on electro-optical modification of the propagation of the TE component and the TM component. The actual conversion of a fraction of the one component into the other component (TE←→TM) with identical intensity takes place in the polarization rotator. In this connection, use is made of a periodic electrode structure provided over a suitably chosen length on top of an optical waveguide in order to bring about a periodic coupling between the two polarization components using suitably chosen, adjustable control voltages. As a consequence of a repeated coupling of this type, it is possible, depending on the chosen control voltage, cycle length and number of couplings, to convert a desired portion of the one component into the other. The polarization converters known from the references [2] and [3] also make use of the principle of periodic coupling between the two polarization components in an optical waveguide on the basis of electro-optical effects with the aid of a periodic electrode structure. Reference 9 discloses a fiber-optical analog of the polarization converter according to reference 2, based on birefringence due to mechanical stress effects. A periodic coupling is achieved in said analog by bringing about a periodic mechanical pressure in the longitudinal direction on a monomodal birefringent fiber or a bimodal fiber using a comb-type pressure device, the transverse pressure exerted by the latter on the fiber being capable of being controlled piezoelectrically. These known converters have the great advantage of electrical controllability, and they are consequently widely applicable, even in the case indicated above. However, they have the drawback that in applications in which a fixed fraction always has to be converted, such a controllability is in fact superfluous, and therefore makes a circuit such as the abovementioned coherent optical receiver unnecessarily complicated and makes the integrability thereof difficult.

SUMMARY OF THE INVENTION

The object of the invention is to overcome the abovementioned drawback. In this connection it makes use of the fact, known from the theory relating to glass fiber splices, such as, for example, from reference [4], that if, in a waveguide, an abrupt discontinuity occurs in the waveguide profile of the guide, it is possible for coupling to take place between a guided mode in the guide upstream of the discontinuity and any possible guided mode downstream thereof. A coupling of this type is, however, generally weak and the fraction of conversion of one mode to a desired one is therefore small. This fraction increases, however, if said discontinuity is repeated in the waveguide with a cycle which is selective for the pair of guided modes involved in the conversion. Making use of this, the invention provides a mode converter for the conversion of a fraction of a signal component of an optical signal propagating according to a first guided mode into a signal component propagating according to a second guided mode, comprising a channel-type waveguide in which a periodic coupling between the two guided modes of an optical signal propagating in the waveguide takes place, which waveguide comprises an incoming wave-guiding section, an intermediate wave-guiding section and an outgoing wave-guiding section, characterized in that the intermediate wave-guiding section has a periodic geometrical structure consisting of a periodic sequence of two wave-guiding subsections within a period length, the lengths of the subsections and the number of periods being matched to the desired conversion fraction. The invention makes it possible to model a specific converter having a desired conversion fraction for every specific pair of guided modes, that is to say an incoming and an outgoing mode, by suitable choice of the waveguide profiles of the subsections, of the lengths and the number of repetitions of the subsections and the manner in which the subsections join one another. The conversion principle of the invention is wavelength-selective, the selectivity increasing as the number of repetitions increases. The invention is very suitable for application in integrated components. It makes it possible to co-integrate a local light source in a simple way into an integrated design of an optical input section of a coherent optical receiver based on polarization diversity.

Reference [8] discloses another specific polarization rotator based on a waveguide of the rib type in which a periodic asymmetric disturbance is provided by means of a periodic asymmetrical loading of the rib over a certain coupling length.

Optical input sections of a coherent optical receiver based on polarization diversity are disclosed per se, for example, by reference [5] and [6]. By applying mode converters according to the invention, a design of an optical section of this type is possible in which the use of metallized elements can be avoided. Such elements are usually necessary in the polarization splitters used in optical sections of this type. The invention therefore also relates to an optical input section for a coherent optical receiver based on polarization diversity, comprising mixing/splitting means for the polarization-independent equal mixing of a first optical signal received via an incoming optical channel and containing polarization modes (TE, TM), and a second optical signal originating from a local light source and containing polarization modes (TE, TM) and then splitting equally in terms of power into first and second mixed signals having two polarization modes, first and second splitting means for the respective splitting up of the two polarization modes present in the first and second mixed signals into separate optical signals, each having one of the two polarization modes, for presentation to equally as many outgoing optical channels, characterized in that first and second conversion means are furthermore provided for converting at least a fraction of one of the two polarization modes into a guided mode different in order from that in which both the polarization modes mentioned propagate in the first optical signal and the second optical signal, respectively, in that the mixing/-splitting means comprise a multimode power coupler, and in that the first and second splitting means are mode splitters.

REFERENCES

[1] GB-A-2090992;
[2] H.-P. Nolting et al., "TE-TM Polarization Transformer With Reset-free Optical Operation For Monolithic Integrated Optics", Proc. ECIO'87 Glasgow, pp. 115-118;
[3] R. C. Alferness and L. L. Buhl, "Electro-optic waveguide TE⟵⟶TM mode convertor with low drive voltage", OPT. Letters, vol. 5, No. 11, Nov. 1980, pp. 473-475;
[4] H.-G. Unger 'Planar optical waveguides and fibres', Clarendon Press, Oxford 1980, cpt 8 'Fibre junctions and transitions', section 8.1 'Analysis of fibre mode excitation', pp. 700-709;
[5] T. Okoshi et al., "Polarization-diversity receiver for heterodyne/coherent optical fiber communication", IOOC '83, June 1983, Paper 30C3-2, pp. 386-387;
[6] C. Duchet and N. Flaaronning, "New TE/TM polarization splitter made in Ti:LiNbO$_3$ using x-cut and z-axis propagation", Electronics Letters, 5th Jul. 1990, Vol. 26, No. 14, pp. 995-997;
[7] W. K. Burns and A. F. Milton, "Mode conversion in planar-dielectric separating waveguides", IEEE J. QUANT, ELECTR., Vol. QE-11, No. 1, January 1975, pp. 32-39;
[8] Y. Shani et al.: "Polarization rotation in asymmetric periodic loaded rib waveguides", Integrated Photonics Research, Apr. 9-11, 1991, paper ThH3, Proc. IPR 1991, pp. 122-123.
[9] R. C. Youngquist et al., "All-fibre components using periodic coupling", IEE Proceedings, Vol. 132, Pt. J., No. 5, October 1985, pp. 277-286.

SHORT DESCRIPTION OF THE DRAWING

The invention will be explained in greater detail by means of the description of a number of exemplary embodiments in which reference is made to a drawing wherein.

DESCRIPTION OF EXEMPLARY EMBODIMENTS

Two polarized modes are able to propagate in a monomodal channel-type (optical) waveguide in an isotropic medium, such as, for example, in InP or in a standard monomodal optical fiber. These modes can be referred to as TE (transverse electric) and TM (transverse magnetic). This terminology is in fact misleading since said modes cannot be described by a single electric or magnetic field component. In a description of these guided modes, all three electric and all three magnetic field vector components must always, after all, be included. Nevertheless, it is the case that, with a choice of an orthogonal axial system which is standard in integrated optics, the TE mode is dominated by the $E_y$ component and the $H_x$ component, and the TM mode by the $E_x$ component and the $H_y$ component. In this connection, the z-axis indicates the propagation direction, and the x-axis is usually chosen perpendicular to the slab-type substrate. Waveguides of this type are, moreover, usually symmetrical with the xz plane as the plane of symmetry as a result of the nature of the known integration techniques. For a channel-type waveguide in a standard optical fiber, any plane through the z-axis is a plane of symmetry. This symmetry manifests itself, in even (+) or odd (−) form, in the field vector components of the guided modes. For the various modes, this even or odd symmetry is shown in TABLE 1.

TABLE 1

| field vector component | mode | | | |
|---|---|---|---|---|
| | $TE_{00}$ | $TE_{01}$ | $TM_{00}$ | $TM_{01}$ |
| $E_x$ | − | + | + | − |
| $E_y$ | + | − | − | + |
| $E_z$ | − | + | + | − |

TABLE 1-continued

| field vector component | mode | | | |
|---|---|---|---|---|
| | $TE_{00}$ | $TE_{01}$ | $TM_{00}$ | $TM_{01}$ |
| $H_x$ | + | − | − | + |
| $H_y$ | − | + | + | − |
| $H_z$ | + | − | − | + |

Waveguide profile of a channel-type waveguide is understood as meaning the geometry of the section of the guide, including the optical properties of the waveguiding medium and its surroundings. From the theory relating to optical fiber splices it is known, for example from reference [4], that if an abrupt transition from one waveguide profile to another waveguide profile occurs in a waveguide, it is possible for coupling to take place between a guided mode in the guide upstream of the transition and any possible guided mode in the conductor downstream of the transition. In this connection, coupling with radiation modes is in principle also possible. However, it is assumed that the transitions referred to in this connection are such that the coupling to radiation modes can be neglected and can therefore be left out of consideration here. The degree of coupling, that is to say, the fraction of the power of a guided mode upstream of the transition which is converted into one or more guided modes downstream of the transition, can be calculated by means of the integral of the scalar product of the (modal) field vectors upstream and downstream of the transition (see equation (8.6) in reference [4]). This theory is generally applicable to any transition from one channel-type conductor into another in a sequence of two or more channel-type waveguides having different modal field profiles. But not every coupling between guided modes upstream and downstream of the transition is readily possible. From TABLE 1 it follows, for example, that, in a succession of two symmetric monomodal waveguides, no conversion of the $TE_{00}$ mode to $TM_{00}$ mode or vice versa can take place since these two modes have a different symmetry. In a sequence of a symmetrical waveguide with an asymmetrical monomodal one, or of two different asymmetrical monomodal waveguides, however, coupling will in fact take place between said TE mode and TM mode since the symmetry of the modal field vector components is destroyed. In a sequence of two different bimodal symmetrical waveguides a good coupling can take place at the transition between the $TE_{00}$ and the $TM_{01}$ mode, or between the $TE_{01}$ mode and the $TM_{00}$ mode and vice versa since, according to TABLE 1, the modes for each pair mentioned have the same field symmetry. The couplings mentioned between the various TE and TM modes at a waveguide transition of this type are, however, weak and the conversion fraction is therefore low. For applications such as, for example, in a coherent optical receiver, however, larger conversion fractions are necessary, in this case approximately 50%, than can be obtained with a single transition. Larger conversion fractions of this type can be obtained by making use of a periodic structure in which the desired coupling is able to repeat itself sufficiently often for the desired conversion fraction to be obtained. Since the propagation constants of the different modes differ to some extent in the same waveguide, the distance between two consecutive couplings can be chosen in such a way that a subsequent coupling takes place whenever the two modes to be coupled have become 180° out of phase since the previous coupling. In that case a positive interference always occurs between the contributions of the same desired mode generated at the consecutive couplings and the contributions of the consecutive couplings will reinforce each other. With given waveguide profiles of the waveguide upstream and downstream of a transition, the distances between successive couplings and the number of repetitions for each mode pair are determined in order to obtain a desired conversion fraction from one mode into a certain other mode. The present coupling mechanism is therefore a selective mechanism.

Figure 1:
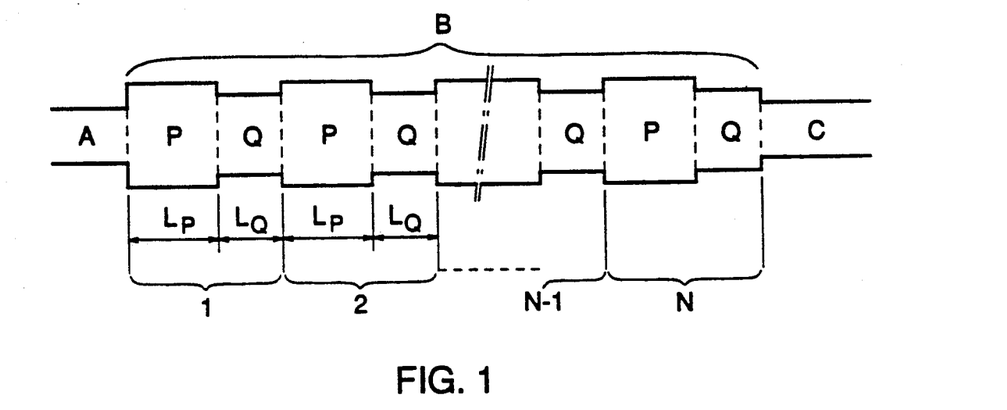
FIG. 1: diagrammatically shows a mode converter according to the invention in a longitudinal section.

FIG. 1 shows diagrammatically in a longitudinal section a mode converter according to the invention made up of channel-type wave-guiding sections, viz. an input section A, an intermediate section B and an output section C. The intermediate section B consists of an N-fold repetition of two sequentially arranged waveguiding subsections P and Q having different modal field profiles. Let the subsections P and Q have mode-dependent propagation constants $\beta_{Pm}$ and $\beta_{Qm}$, respectively, where the idex m may have the values 1 and 2. In this connection, m=1 indicates the mode of which a fraction has to be converted and m=2 indicates the mode in which said conversion results. The lengths $L_P$ and $L_Q$ of the subsections P and Q are determined by $$L_P = \pi |\beta_{P1} - \beta_{P2}|^{-1} \text{ and } L_Q = \pi |\beta_{Q1} - \beta_{Q2}|^{-1} \quad (1)$$

the number of repetitions N is determined by $$f_{12} = \sin^2(2C_{12} \cdot N) \quad (2)$$

where:

$f_{12}$ is the fraction of the intensity of the mode 1 at the transition from the section A to the first subsection P, which fraction is converted into mode 2 after N couplings at the transition from the N-th subsection Q to the section C;

$C_{12}$ = the coupling factor of the modes 1 and 2 at each P-Q and Q-P transition.

TABLE 2

| m = 1 | m = 2 | type | P | Q | A,C |
|---|---|---|---|---|---|
| $TE_{00}$ | $TE_{01}$ | bimod | asym | sym | (a)sym |
| " | " | " | sym | asym | " |
| " | " | " | asym | asym | " |
| $TE_{00}$ | $TM_{00}$ | monomod | asym | sym | (a)sym |
| " | " | " | sym | asym | " |
| " | " | " | asym | asym | " |
| $TE_{00}$ | $TM_{01}$ | bimod | sym | sym | (a)sym |
| $TE_{01}$ | $TM_{00}$ | bimod | sym | sym | (a)sym |
| $TE_{01}$ | $TM_{01}$ | bimod | asym | sym | (a)sym |
| " | " | " | sym | asym | " |
| " | " | " | asym | asym | " |
| $TM_{00}$ | $TM_{01}$ | bimod | asym | sym | (a)sym |
| " | " | " | sym | asym | " |
| " | " | " | asym | asym | " |
| m = 2 | m = 1 | type | P | Q | A,C |

TABLE 2 shows which mode conversions can be achieved with a channel-type waveguide structure as shown in FIG. 1. The ditto mark " indicates that the same item is meant as in the row above. Each row in the table is interpreted in the following way. A guided mode entering via the input section A referred to or ditto-marked in the first column under m=1, is converted into the guided mode referred to or ditto-marked in the second column next thereto under m=2 if the wave-guiding sections P, Q, A and C are of the type mentioned in the third column next thereto and are symmetrical or asymmetrical in accordance with the descriptions in the corresponding columns. Thus, for example, the seventh row means that the mode $TE_{00}$ in a bimodal channel-type waveguide (indicated by bimod) having symmetrical subsections P and Q (indicated by sym) can be converted into the $TM_{01}$ mode, it being possible for the section A and the section C to be symmetrical or asymmetrical (indicated by (a)sym). Furthermore, the 4th, 5th and 6th row, read in combination, indicate that in a monomodal waveguide (indicated by monomod), at least one of whose subsections P and Q is asymmetrical, the mode $TE_{00}$ can be converted into the mode $TM_{00}$.

If the mode converter is one which converts a guided mode of the zero-th order into a guided mode of the first order, the wave-guiding section A can be monomodal, while the section P and Q are bimodal. Preferably, a tapered piece is then provided between section A and the first section P, which tapered piece forms a gradual transition from monomodal to bimodal without a coupling such as that in the transition between the sections P and Q being able to occur.

In view of the reciprocal nature of the coupling mechanism underlying the mode conversions, TABLE 2 remains completely valid if the items of the columns $m=1$ and $m=2$ are interchanged. This is indicated in the last line of the table by $m=2$ and $m=1$, respectively, underneath the first and second column.

In FIG. 1, the various wave-guiding sections A, P, Q and C are shown with different cross section. This is purely symbolic in order to indicate that their waveguide profiles may differ. Although differences of this type can often easily be achieved by such differences in cross section, they may also be obtained in other ways. In addition, if one of the subsections is symmetrical, the waveguide profile of said subsection and the waveguide profiles of the sections A and C can be chosen to be identical.

Figure 2:
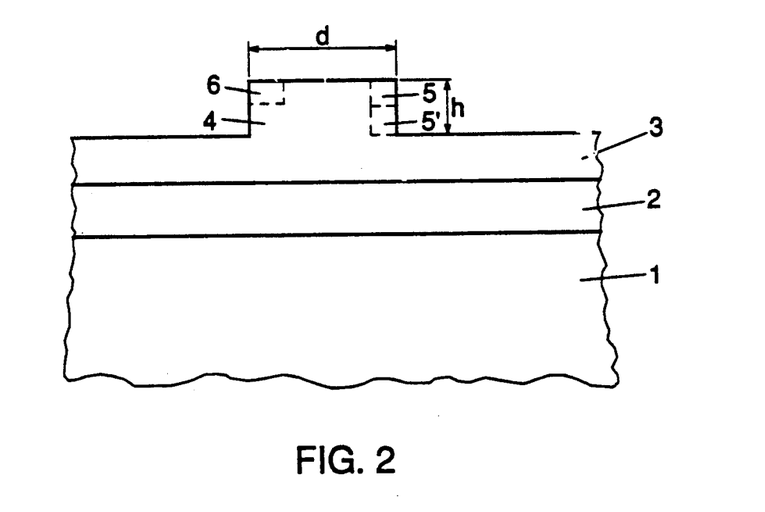
FIG. 2: diagrammatically shows an optical waveguide of the rib type in cross section suitable for a mode converter according to FIG. 1.

Each converter according to TABLE 2 having a structure according to FIG. 1 can easily be implemented in integrated form, for example on the basis of InP. FIG. 2 shows a cross section of a channel-type waveguide having a rib structure. A substrate 1 of InP having a refractive index $n_1$ supports a light-guiding film 2 of InGaAsP having a refractive index $n_2$ somewhat higher than $n_1$, and a buffer layer 3 of InP thereon, again having a refractive index $n_1$. Said buffer layer 3 is provided with a rib 4 having a rectangular cross section, height h and width d of the same material for example obtained from the buffer layer by recessing with the aid of etching techniques. The waveguide formed under a rib having a rectangular cross section of this type in an isotropic medium is a symmetrical one. The waveguide becomes an asymmetric one by destroying said symmetry, for example by removing a small corner 5 in the right upper corner from the rectangular cross section over the length of the waveguide, for example by an additional etching operation. By providing, in the same but mirror-image way, the asymmetry in the cross section, instead of at the right-hand side, at the left-hand side, that is to say, in this example by removing an equally large small corner 6, an asymmetrical waveguide is also obtained, but with an opposite symmetry. If the same but mutually mirror-image symmetry is provided in the cross section both on the right and on the left, that is to say by removing both a small corner 5 and a small corner 6, a symmetrical waveguide is again obtained, but with a wave-guide profile different from the waveguide having the original rectangular cross section. Instead of removing material, the same effects can, of course, be obtained by growing on material. As a result of a suitable choice of the width d, the waveguide becomes monomodal or bimodal. Different symmetrical waveguides can also be obtained by a small variation in the width d, in which case the mode type of the waveguide does not change. An asymmetry to be provided must also be such that the mode type of the waveguide does not change, but this is not, however, critical.

At a transition in a sequence of wave-guiding sections, however, the concept of asymmetry is relative. A transition between two sequentially arranged symmetrical sections, of which the plane of symmetry of the section is offset downstream of the transition with respect to the plane of symmetry of the section upstream thereof is nevertheless a transition from a symmetrical to an asymmetrical guiding section for a guided mode. This applies both to symmetrical sections having identical waveguide profiles and to symmetrical sections having different waveguide profiles. This means that a symmetrical wave-guiding section having an asymmetrical narrowing or widening with respect to a symmetrical wave-guiding section preceding it also provides a symmetry/asymmetry transition. This corresponds, however, to an asymmetry obtained, respectively, by the removal or the growth of a small corner 5' having the same height h as the rib 4. A separate etching operation is, however, no longer necessary for a removal of this type.

All the modifications required for a specific mode converter can be provided simply and with the required accuracy on a waveguide of this type having a rib structure with existing etching techniques by suitable choice of the masks to be used in the process. Of course, other waveguide structures standard in integrated optics can also be used for this purpose. More generally still, any mode converter from TABLE 2 can be produced by simple modifications to any single channel-type waveguide with the aid of known integration techniques.

EXAMPLE 1

According to TABLE 2, a $TE_{00} \rightarrow TM_{00}$ converter can be produced with the aid of monomodal waveguide sections. For a rib-type waveguide as described above on an InP substrate, $n_1 = 3.209$, and a film of InGaAsP, $n_2 = 3.325$, film thickness 0.50 $\mu$m, buffer layer thickness 0.10 $\mu$m, rib height (above the buffer layer 3) 0.45 $\mu$m, rib width must be chosen $d = 2.0$ $\mu$m (monomodal!), $L_P \approx L_Q =$ approximately 80 $\mu$m. The refractive indexes $n_1$ and $n_2$ and the lengths $L_P$ and $L_Q$ of the subsections apply to optical signals having a wavelength of 1.3 $\mu$m. The sections A and C are symmetrical and have the same waveguide profile. If one of the two subsections is asymmetrical, for example the section P, as a result of removing a small corner 5 having a height of 0.23 $\mu$m and a square cross section, and the other symmetrical, for example having the same modal field profile as the sections A and C, the calculated coupling factor is $C_{12} = 3.4 \cdot 10^{-3}$ for the coupling between the modes $TE_{00}$ and $TM_{00}$. To obtain a conversion of 50%, the fraction $f_{12}$ must be $= \frac{1}{2}$. This is achieved, according to equation (2) if $2C_{12} \cdot N = \frac{1}{4}\pi$, that is to say if the number of periodic repetitions of the coupling $N = 116$. The total length of the section B is then approximately 18.5 mm. If the subsection Q is also made asymmetrical, with an asymmetry equal to but the mirror image of that of the subsection P, the coupling factor doubles as a result, so that the number of couplings, and consequently the length of the section B, can be reduced to half. For a 100% conversion, the number N has to be doubled.

EXAMPLE 2

According to TABLE 2, a $TM_{00} \to TM_{01}$ converter can be constructed with the aid of bimodal waveguide sections. This type of mode converter has been designed with the aid of a calculation method known under the name Effective Index Method. For a rib-type waveguide as described above on an InP substrate, $n_1 = 3.1754$, and a film of InGaAsP, $n_2 = 3,4116$, film thickness 0.473 μm, buffer layer thickness 0.304 μm, rib height (above the buffer layer 3) 0.200 μm, rib width $d = 8.5$ μm (bimodal!), $L_P$ must be chosen $= L_Q = 387$ μm. The refractive indexes $n_1$ and $n_2$, and the lengths $L_P$ and $L_Q$ of the subsections are given here for optical signals having a wavelength of 1.5 μm. The two subsections are symmetrical and have the same waveguide profile. The subsections P and Q are connected in sequence in the longitudinal direction alternately offset to the left and to the right with respect to one another, the offset always being 0.56 μm. The calculated coupling factor $C_{12} = 0.131$ for the coupling between the $TM_{00}$ and $TM_{01}$ modes. To obtain a conversion of 100%, at least with sufficient accuracy, a total of 12 sections are sufficient. The attenuation occurring in the process is calculated to be $<0.1$ dB. The total length of the converter is approximately 4.7 mm. If the section A is monomodal, at least for the TM polarization, for example having a rib width of 4.3 μm, a tapered piece must be included between the section A and the first subsection P of the intermediate section B to achieve a gradual transition from a monomodal to a bimodal waveguide. The section C may be a direct continuation of the last subsection P or Q.

With the aid of FIGS. 3 to 6 inclusive, some applications will be explained below of the mode converters described above in two types of optical input sections, known per se, for a coherent optical receiver operating on the basis of polarization diversity.

Figure 3:
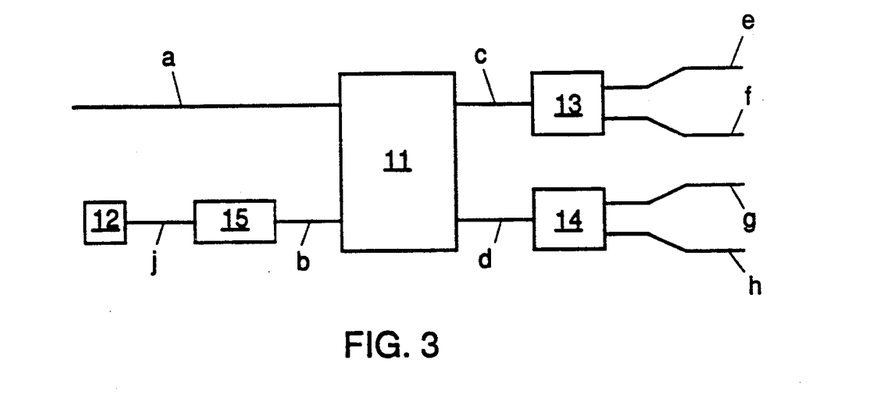
FIG. 3: shows a block diagram of a known optical input section of a coherent optical receiver in which mixing precedes splitting.

FIG. 3 shows a block diagram of a first type of the known optical input sections in which mixing precedes splitting. This section comprises a mixer 11 having an input optical channel a for any light signal to be detected, that is to say with an unknown TE/TM polarization distribution, and an input optical channel b for a light signal having a 50% TE/TM polarization distribution originating from a local light source 12. The mixer 11 distributes a signal it has mixed equally in terms of power over two optical channels c and d. Then each of the signals obtained on these outputs is split with the aid of TE/TM polarization splitters 13 and 14 known per se, and the signals split in this way are presented at outgoing optical channels e, f, g and h of said splitters for further processing. All the optical channels are in principle monomodal. A 3 dB power coupler is known as mixer. The local light source 12 is preferably co-integrated in an integrated form of an optical input section of this type. If said light source 12 is a laser, it can only provide one state in which a light signal it emits via a optical channel j contains only one polarization component. Thus, the light signal of a co-integrated laser standard in integration on the basis of InP and having light in the near infrared contains only the TE polarization component. This means that a mode converter has to be incorporated between the output of the light source 12 and the input optical channel b of the mixer 11 for a partial polarization mode conversion, in this case 50%. Since both the optical channel j and the optical channel b are monomodal, a 50% $TE_{00} \to TM_{00}$ mode converter 15 according to the invention can be chosen for this purpose.

Figure 4:
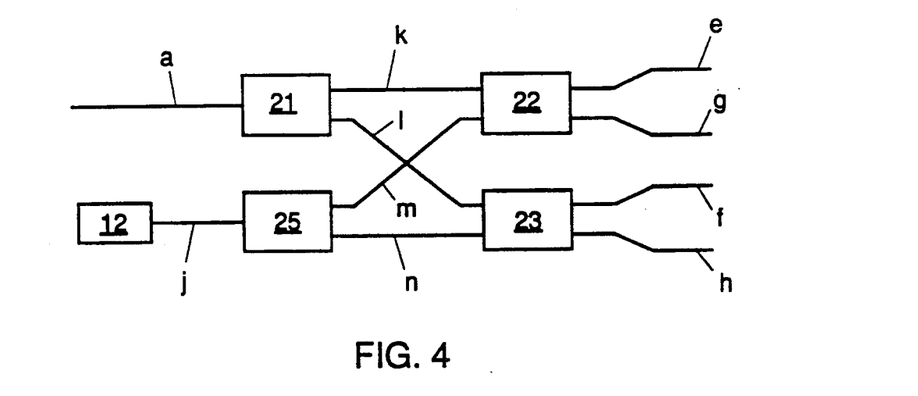
FIG. 4: shows the same as FIG. 3, wherein splitting precedes mixing.
Figure 5:
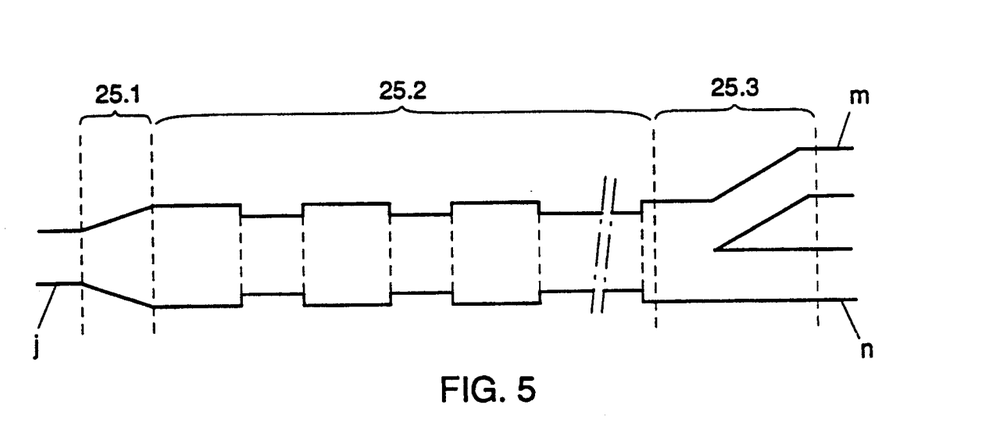
FIG. 5: shows a combined mode converter/splitter according to the invention in longitudinal section.
Figure 6:
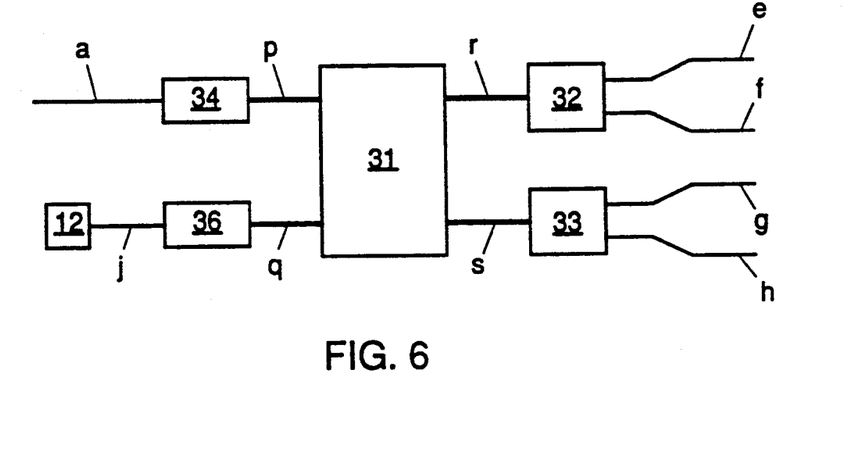
FIG. 6: shows a block diagram of an optical input section according to the invention.

FIG. 4 shows a block diagram of an optical input section in which splitting precedes mixing. A light signal received via the input channel a is now first presented to a TE/TM polarization splitter 21. Signals split as a result in polarization mode, TE and TM, are presented via optical channels k and l to different 3 dB power couplers 22 and 23, respectively, for mixing with light signals, corresponding in polarization mode, presented via optical channels m and n and originating from the local co-integrated light source 12. Between the output optical channel j of the light source 12 and the optical channels m and n a combined mode converter/splitter 25 has been included for this purpose. All the optical channels a, e to h inclusive, and j to n inclusive are again monomodal. More generally, a combined mode converter/splitter 25 has the function of sending a converted signal fraction which has been split off from the remaining unconverted signal to a separate output. A mode converter/splitter of this kind is shown in detail in FIG. 5 and is made up of three sections, viz.:

a tapered piece 25.1 for converting the monomodal optical channel j into a bimodal optical channel, a $TX_{00} \to TY_{01}$ mode converter 25.2 according to TABLE 2, TX and TY each representing one of the two polarization modes TE and TM, and a mode splitter 25.3; for this purpose, a splitter can be used which is based on a monomodal asymmetrical branching of a bimodal waveguide, that is to say, with a continuation in two monomodal branches having different propagation constants, such as is disclosed, for example, by reference [7] (more particularly, FIG. 2(a)). In a splitter of such a type, a first-order guided mode upstream of the branching is completely converted into a zero-order guided mode of the branch having the lowest propagation constant, while the zero-order guided mode upstream of the branch propagates in the branch having the highest propagation constant. A mode splitter of this type can be used here because the converter 25.2 preceding it delivers an optical signal in which the TX polarization mode propagates exclusively as a zero-order guided mode and the TY polarization mode propagates exclusively as a first-order guided mode. The advantage of this type of mode splitter is that it does not contain any metallized waveguide(s), this being in contrast to the polarization splitters usually used. Use of metallized elements in an integrated optical design requires, after all, additional measures to prevent interfering effect on surrounding optical components. If a 100% $TX_{00} \to TX_{01}$ converter is chosen as mode converter 25.2 in a combined mode converter/splitter of this type, TX again standing for one of the two polarization modes, a polarization splitter is obtained which also has no metallized elements. The combined mode converter/splitter 25 may be used in the optical input section according FIG. 4 if the mode converter 25.2 incorporated therein is a 50% $TE_{00} \to TM_{01}$ mode converter, proceeding from the assumption that again only the TE polarization mode is presented at the optical channel j. FIG. 6 shows a block diagram of an optical input signal which can be implemented completely without such metallized elements. Just as in the optical input section according to the block diagram of FIG. 3, the mixing takes place here prior to splitting. The essential difference is, however, that the mixing takes place at multimodal level with the aid of a mixer 31 of the multimodal 3 dB power coupler type having bimodal input channels p and q and bimodal output channels r and s. To distinguish them from the monomodal optical channels, said bimodal optical channels are shown thickened in the figure. As splitting means, mode splitters 32 and 33 of the same type as the mode splitters 25.3 (see FIG. 5) may be used if it is ensured that, in the optical channels r and s, and therefore also in the optical channels p and q, the two different polarizations TE and TM exclusively propagate in mutually different orders of guided mode, on an equal basis in each of the optical channels p to s inclusive. For this purpose, a 100% $TM_{00} \rightarrow TM_{01}$ converter 34 is incorporated between the monomodal input channel a and the bimodal input channel p, and a 50% $TE_{00} \rightarrow TM_{01}$ converter 36 is incorporated between the monomodal optical channel j for guiding the optical signal originating from the light source 12 and the bimodal input optical channel q of the mixer 31. Both converters 34 and 36 have again been chosen in accordance with TABLE 2; and each of said converters should also be preceded by a tapered piece such as 25.1 from FIG. 5. The outgoing optical channels e to h inclusive are identical to those in FIG. 3 and are therefore provided with corresponding letters.

Figure 7:
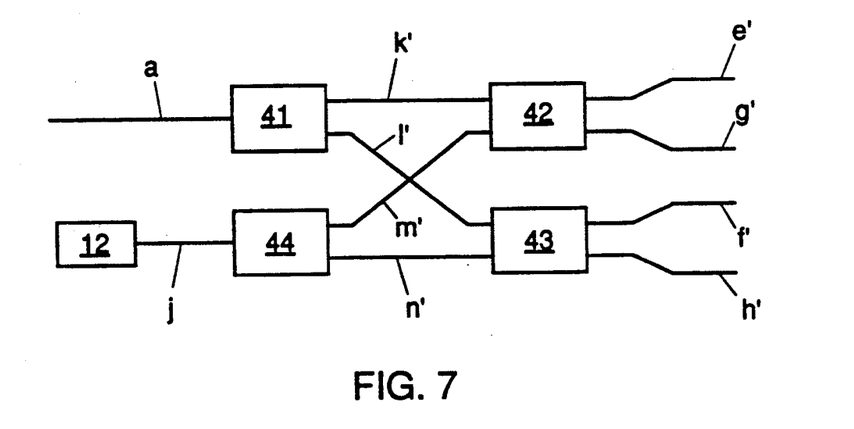
FIG. 7: shows the same as FIG. 4.

FIG. 7 shows a block diagram of an optical input section in which splitting precedes mixing, said input section being a variant of and being capable of being represented by the same block diagram as the input section according to FIG. 4. An optical signal received via the input channel a is now first presented to a combined mode converter/splitter 41 having outgoing monomodal optical channels k' and l' of the same type as the mode converter/splitter 25 described above (see FIG. 5), in which the mode converter (25.2 in FIG. 5) is a 100% $TM_{00} \rightarrow TE_{01}$ mode converter. As a result, signals having the polarization mode TE are presented via both the optical channels k' and l' to different 3 dB power couplers 42 and 43, one of said signals corresponding to the converted TM component of the signal received via the input channel a. The optical signal from the light source 12, which also has the polarization mode TE, is now fed via the output optical channel j of the light source 12 to the input of a symmetrical Y splitter 44 and is presented to the power couplers 42 and 43 after being distributed in terms of power over outgoing monomodal optical channels m' and n'. In this variant, signals exclusively having the polarization mode TE are presented for further processing on the outgoing optical channels e', f', g' and h'. The advantages of this variant are that optimization is required only for one polarization mode on integration and that, just as in the input section according to FIG. 6, no polarization splitters provided with metal elements are again needed in this case. In addition, a further advantage is that the Y splitter 44 is much easier to construct than the polarization-converting and splitting components which are necessary immediately downstream of the local oscillator 12 in the other variants according to FIG. 3, FIG. 4 and FIG. 6.

I claim:

1. Mode converter for the conversion of a fraction of a signal component of an optical signal propagating according to a first guided mode into a signal component propagating according to a second guided mode, comprising a channel-type waveguide in which a periodic coupling between the two guided modes of an optical signal propagating in the waveguide takes place, which waveguide comprises an incoming wave-guiding section, an intermediate wave-guiding section and an outgoing wave-guiding section, characterized in that the intermediate wave-guiding section has a periodic geometrical structure consisting of a periodic sequence of two wave-guiding subsections within a period length, the lengths of the subsections and the number of periods being matched to the desired conversion fraction.

2. Mode converter according to claim 1, characterized in that a period length comprises a first subsection having a first asymmetrical waveguide profile and a second subsection having a second symmetrical waveguide profile.

3. Mode converter according to claim 2, characterized in that the waveguide profiles of the second subsection and the incoming wave-guiding section are essentially the same.

4. Mode converter according to claim 3, characterized in that the subsections are monomodal.

5. Mode converter according to claim 3, characterized in that the subsections are bimodal.

6. Mode converter according to claim 1, characterized in that a period length comprises two subsections, each having an asymmetrical waveguide profile.

7. Mode converter according to claim 6, characterized in that the subsections are monomodal.

8. Mode converter according to claim 6, characterized in that the subsections are bimodal.

9. Mode converter according to claim 6, characterized in that the waveguide profiles of the two subsections have a mutually opposite asymmetry.

10. Mode converter according to claim 1, characterized in that a period length comprises two subsections, each having a symmetrical waveguide profile.

11. Mode converter according to claim 1, characterized in that the period length comprises two subsections having the same waveguide profile, which subsections join one another in the periodic sequence in an offset manner.

12. Mode converter for the conversion of a fraction of a signal component of an optical signal propagating according to a first guided mode into a signal component propagating according to a second guided mode, comprising a channel-type waveguide in which a periodic coupling between the two guided modes of an optical signal propagating in the waveguide takes place, which waveguide comprises an incoming wave-guiding section, an intermediate wave-guiding section and an outgoing wave-guiding section, characterized in that the intermediate wave-guiding section has a periodic geometrical structure consisting of a periodic sequence of two wave-guiding subsections within a period length with different waveguide profiles essentially as a result of differences in width, the lengths of the subsections and the number of periods being matched to the desired conversion fraction.

13. Mode converter according to claim 12, characterized in that a period length comprises a first subsection having a first asymmetrical waveguide profile and a second subsection having a second symmetrical waveguide profile.

14. Mode converter according to claim 13, characterized in that the waveguide profiles of the second subsection and the incoming wave-guiding section are essentially the same.

15. Mode converter according to claim 14, characterized in that the subsections are monomodal.

16. Mode converter according to claim 14 characterized in that the subsections are bimodal.

17. Mode converter according to claim 12, characterized in that a period length comprises two subsections, each having an asymmetrical waveguide profile.

18. Mode converter according to claim 17, characterized in that the subsections are monomodal.

19. Mode converter according to claim 17, characterized in that the subsections are bimodal.

20. Mode converter according to claim 17, characterized in that the waveguide profiles of the two subsections have a mutually opposite asymmetry.

21. Mode converter according to claim 12, characterized in that each period length comprises two subsections, each having a symmetrical waveguide profile.

22. Optical input section for a coherent optical receiver based on polarization diversity, comprising
mixing/splitting means for the polarization-independent equal mixing of a first optical signal received via an incoming optical channel and containing polarization modes (TE, TM), and a second optical signal originating from a local light source and containing polarization modes (TE, TM) and then splitting equally in terms of power into first and second mixed signals,
first and second splitting means for the respective splitting up of polarization modes present in the first and second mixed signals into separate optical signals for presentation to equally as many outgoing optical channels, characterized in that first and second conversion means are furthermore provided for converting at least a fraction of one of the polarization modes into a guided mode different in order from that in which the polarization modes mentioned propagate in the first optical signal and the second optical signal, respectively;
in that the mixing/splitting means comprise a multimode power coupler; and in that the first and second splitting means are mode splitters.

23. Optical input section according to claim 22, characterized in that the local light source is co-integrated, and in that the first conversion means comprise a 100% $TM_{00} \rightarrow TM_{01}$ converter according to TABLE 2, and the second conversion means comprise a 50% $TE_{00} \rightarrow TM_{01}$ converter according to TABLE 2.

24. Combined mode converter/splitter for converting a fraction of a first signal component of an incoming first optical signal propagating in a first polarization mode (TE or TM) into a second signal component propagating in a second polarization mode (TM or TE), and the emission of second and third optical signals respectively via outgoing second and third monomodal optical waveguides, the second optical signal essentially containing the second signal component and the third optical signal essentially containing the unconverted part of the first optical signal, which converter/splitter consecutively comprises between the first optical waveguide and the second and third optical waveguides:
a tapered piece for the transition of a monomodal to a bimodal optical waveguide,
conversion means for converting at least a fraction of the first signal component into a guided mode differing in order from that in which the first signal component propagates in the first optical signal on leaving the tapered piece, and
a mode splitter.

25. Combined mode converter/splitter according to claim 24, characterized in that the conversion means comprise a 50% $TE_{00} \rightarrow TM_{01}$ converter according to TABLE 2.

26. Combined mode converter/splitter according to claim 24, characterized in that the conversion means comprise a 100% $TM_{00} \rightarrow TE_{01}$ converter according to TABLE 2.

27. Combined mode converter/splitter according to claim 24, characterized in that the conversion means comprise a 100% $TX_{00} \rightarrow TX_{01}$ converter according to TABLE 2, TX representing one of the two polarization modes TE or TM.

* * * * *